United States Patent [19]
Sirica

[11] Patent Number: 6,152,183
[45] Date of Patent: Nov. 28, 2000

[54] NOZZLE CAP FOR SEALING A NOZZLE BY WELDING WITH A FLEXIBLE ELEMENT AND METHOD THEREFOR

[75] Inventor: Edward G. Sirica, East Hartford, Conn.

[73] Assignee: CE Nuclear Power LLC, Windsor, Conn.

[21] Appl. No.: 09/112,285

[22] Filed: Jul. 9, 1998

Related U.S. Application Data

[60] Provisional application No. 60/077,941, Mar. 13, 1998.

[51] Int. Cl.⁷ .................................................... F15L 55/10
[52] U.S. Cl. .......................................... 138/89; 138/96 T
[58] Field of Search ..................................... 138/89, 96 R, 138/96 T; 215/232; 220/359.1, 359.4, 359.5

[56] References Cited

U.S. PATENT DOCUMENTS

| | | | |
|---|---|---|---|
| 1,807,565 | 5/1931 | Burnish | 138/96 T |
| 1,847,396 | 3/1932 | Hochenauer et al. | 138/96 T |
| 2,930,409 | 3/1960 | Higgins | 138/96 T |
| 4,335,756 | 6/1982 | Sharp et al. | 138/96 R X |
| 4,483,371 | 11/1984 | Susin | 138/96 R X |
| 4,655,483 | 4/1987 | Margotta | 285/169 |
| 5,004,016 | 4/1991 | Kliewer | 138/96 R X |
| 5,631,936 | 5/1997 | Theroux et al. | 376/204 |
| 5,701,935 | 12/1997 | Vasudeva | 138/96 T X |

FOREIGN PATENT DOCUMENTS

| | | | |
|---|---|---|---|
| 1463595 | 12/1966 | France | 138/96 R |

*Primary Examiner*—Patrick Brinson
*Attorney, Agent, or Firm*—Henry T. Chenshaw, Jr. Esq.; Ronald P. Kananen; Rader, Fishman & Grauer

[57] ABSTRACT

A nozzle cap for sealing a nozzle which penetrates a nuclear reactor vessel, and a method of using such, is provided, and includes a closure portion suitable for closing an open end of the nozzle under pressure associated with the nuclear reactor vessel, a skirt portion that is cylindrically formed beneath the closure portion, a flexible element that is secured to the skirt portion and may include concave portions to accommodate vibration movements between the nozzle and the nozzle cap, and a weldment lip that is secured to the flexible element, and welded to the nozzle.

12 Claims, 3 Drawing Sheets

NOZZLE CAP FOR SEALING A NOZZLE BY WELDING WITH A FLEXIBLE ELEMENT AND METHOD THEREFOR

The subject matter of the present application is disclosed in applicant's co-pending Provisional U.S. patent application Ser. No. 60/077,941 filed Mar. 13, 1998, from which priority is claimed.

BACKGROUND OF THE INVENTION

This invention relates to a nozzle cap and a method for sealing a nozzle. More particularly, this invention relates to a nuclear power reactor in which the nozzle cap is used to seal penetrations into the nuclear reactor vessel.

In many industrial applications, particularly in nuclear power related technologies, penetrations must be made in large vessels within which processes occur at high pressure. In the case of a nuclear reactor vessel, such penetrations are necessary for providing openings through which control rods or instrumentation may be inserted into the reactor core. Typically, nozzles are welded to the vessel wall to provide support surfaces on which other equipment associated with the manipulation of the control rods or instruments, may be mounted.

A pressurized water reactor (PWR) vessel used in a nuclear facility includes a nuclear control rod drive mechanism mounted on such a nozzle in the reactor vessel head to control movement of an associated neutron absorbing control rod. A nuclear reactor vessel, showing a control rod drive mechanism housing connected to a reactor vessel nozzle extending from the reactor vessel head, is depicted in FIG. 1. A nuclear reactor system 10 is shown having a reactor 12 including a substantially upright cylindrical vessel 14 and a substantially semi-hemispherical head 16. The vessel has an upper flange 18 and the head has a lower flange 20 which are secured together for normal operation of the reactor system 10. The nuclear power generated in the reactor can be controlled by an increase or decrease in the amount of neutron absorbing material that is inserted into or withdrawn from the core in the vessel 14. This is typically accomplished by a plurality, normally at least several, control rod clusters or assemblies (not shown) each of which pass through a nozzle 22. Only one of the reactor vessel nozzles 22 in the head is shown, but it should be appreciated that normally there are many nozzles and control rod assemblies that are moved into and out of the vessel 14 during operation. Each control rod drive assembly includes a control rod drive mechanism housing 24, which has an associated motor (not shown) for effectuating the movement of the control rods.

As shown in U.S. Pat. No. 5,631,936 which is assigned to the assignee of this invention ('936 Patent), the housing has an omega lip including a free end, and the reactor vessel nozzle has a complementary omega lip which includes a semi-rigid, annular seat member placed within one of the lips. The housing is positioned in vertical alignment with the nozzle so that the free end of the housing lip and the free end of the nozzle lip are juxtaposed, thereby forming an omega structure having a cavity occupied by a seat member, a gap between the free ends of the lips, and an outer surface on either side of the gap. A semi-rigid ring, or omega seal, is positioned in conforming relation to the outside surface of the omega structure. Thus, a compressive force applied and maintained on the exterior of the seal ring extrudes a portion of the ring into the gap.

A number of other features of the relationship between nozzles and a reactor head are also discussed in the '936 patent which is hereby incorporated by reference for purposes of completeness of this disclosure.

Another example of a boundary seal for vessel penetration is shown in U.S. Pat. No. 4,655,483 ('483 Patent), which is assigned to the assignee of this invention. The disclosure of the '483 patent is also hereby incorporated by reference for purposes of completeness of this disclosure.

Occasionally, the equipment mounted on the nozzle must be removed for maintenance or repair. When maintenance on the control rod drive mechanisms is required, or when the control rod drive mechanisms are replaced, omega seal welds joining the housing components are cut, the housings removed, and new assemblies installed. These procedures involve laborious, time-consuming processes as discussed, for example, in the '936 Patent. Furthermore, prior to replacement of control rod drive mechanisms, monitoring of omega seals can be time consuming, and the omega seals may deteriorate with time.

Accordingly, it is generally desired to remove control rods or instrumentation that may be inserted into the reactor core, and prior to their replacement, to cap one, some, or all of the nozzles on the reactor head. It has been proposed that a suitable cap should include a rigid element to be welded to a reactor head nozzle. However, a potential problem exists with such a cap in that a rigid element would be subjected to undue stresses because of relative movements between the nozzle and the cap.

It is therefore an object of the present invention to improve upon the seals for nozzles in a rector head vessel compared to the seals in the prior art.

It is a further object of the present invention to provide a nozzle cap suitable for capping or closing any nozzle in a nuclear reactor head.

SUMMARY OF THE INVENTION

The above described needs and others are met by a nozzle cap for sealing a nozzle which penetrates a nuclear reactor vessel and includes a closure portion suitable for closing an open end of the nozzle under pressure associated with the nuclear reactor vessel, a skirt portion that is cylindrically formed beneath the closure portion, a flexible element that is secured to the skirt portion, and a weldment lip that is secured the flexible element, and welded to the nozzle. The nozzle may be made of stainless steel or an Inconel® brand alloy. In such case, the weldment lip is welded to the nozzle using a weldment material of either stainless steel or a suitable Inconel® brand nickel-chromium-iron alloy. The skirt portion may include a set of threads on an inner surface that communicate with another set of threads located on an outer surface of the nozzle.

The flexible element accommodates minor movements between the nozzle and the nozzle cap. Features that are part of the flexible element and provide this function include a first concave portion that is located on a surface opposing the nozzle, and second and third concave portions that are located on a surface opposite that of the first concave portion. The second concave portion may have a greater radius of curvature than that of the first concave portion. The second and third concave portions may be connected by a convex portion, and the third concave portion may have a smaller radius of curvature than the second concave portion.

The above described needs and others are also met by a method for sealing a nozzle which penetrates a nuclear reactor vessel, and includes the steps of providing a nozzle cap as described above, attaching the nozzle cap to the nozzle by rotating the nozzle cap, thereby matching the threads of the skirt portion with the threads of the nozzle, until the closure portion of the nozzle cap closes the nozzle, and welding the weldment lip to the nozzle.

DESCRIPTION OF THE PREFERRED EMBODIMENT

Figure 1:
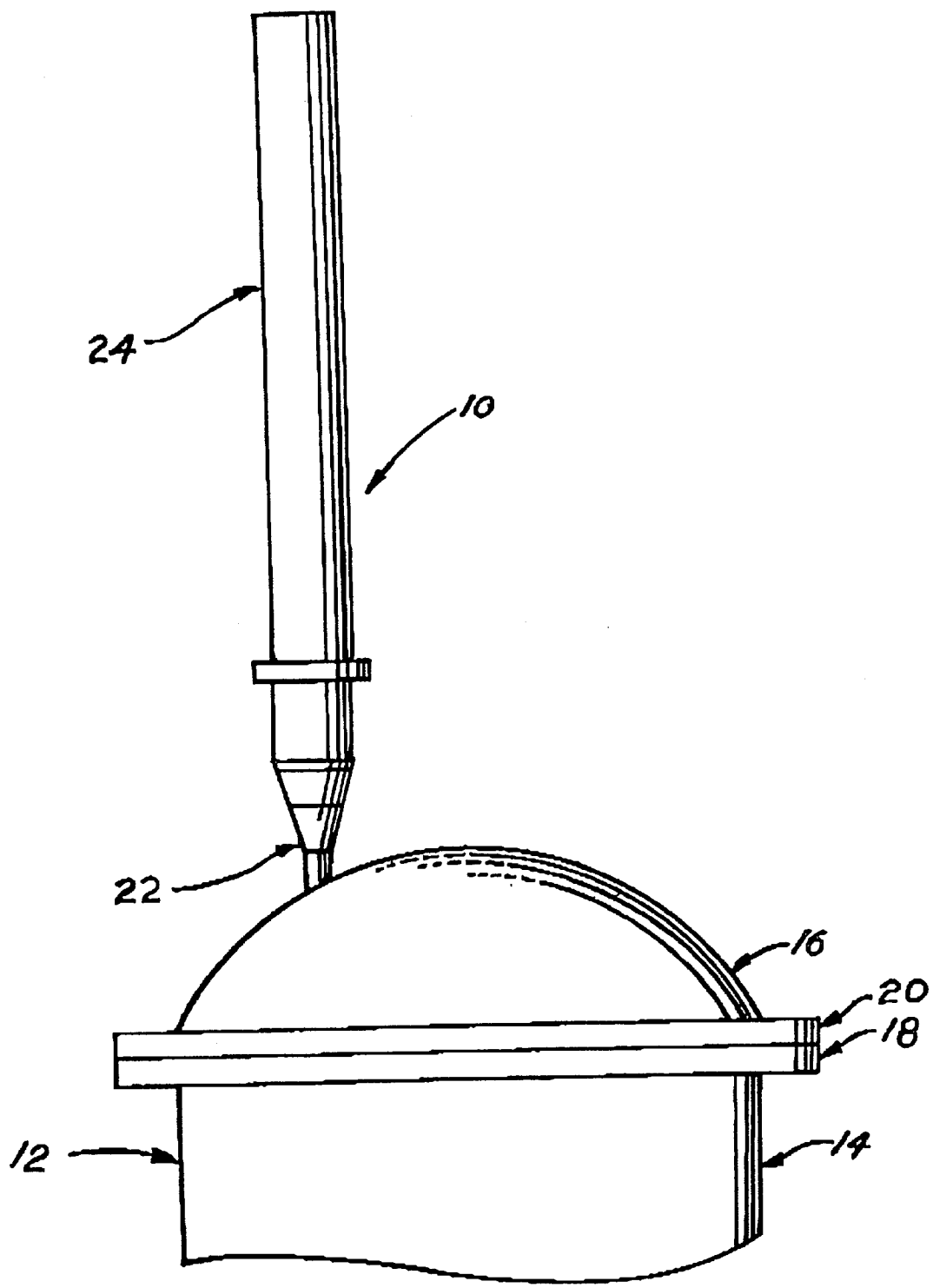
FIG. 1 shows a schematic elevation view of the upper portion of a nuclear reactor vessel, showing a control rod drive mechanism housing connected to a reactor vessel nozzle extending from the reactor vessel head according to the prior art.
Figure 2:
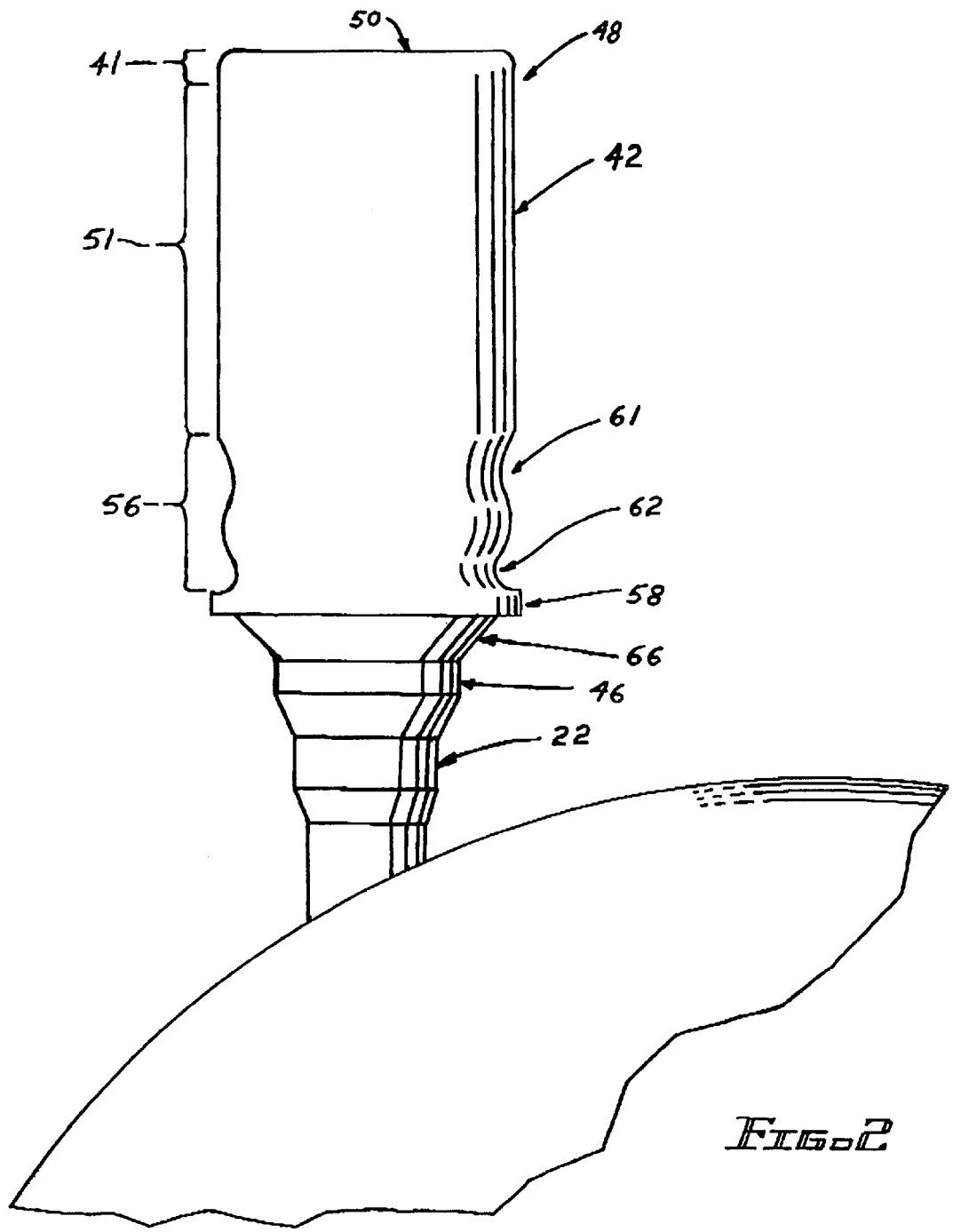
FIG. 2 is a partial schematic elevation view of the upper portion of a nuclear reactor vessel, with the control rod drive mechanism housing removed, and the nozzle capped with the nozzle cap of the present invention.
Figure 3:
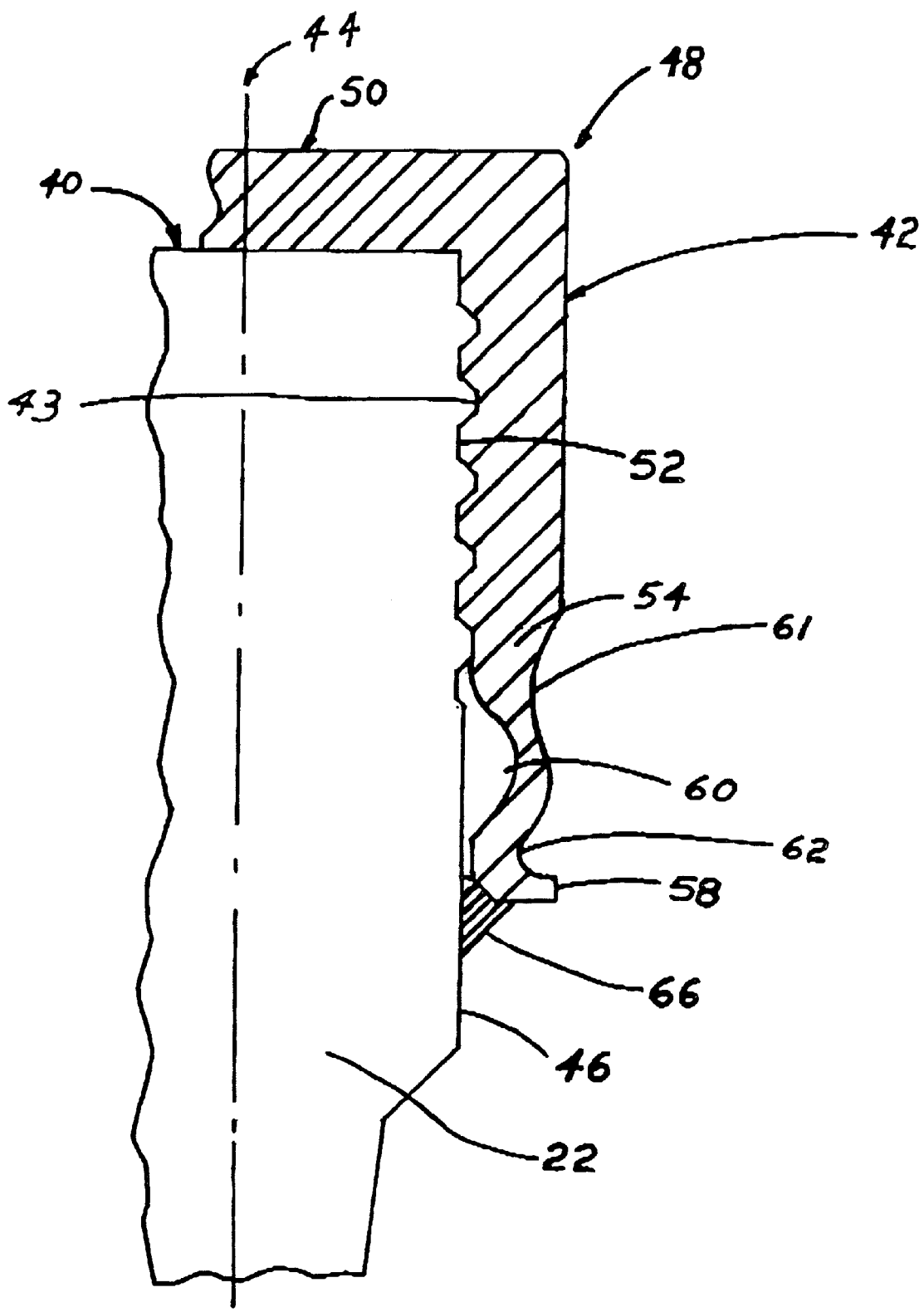
FIG. 3 is a partial schematic cross sectional view of the nozzle cap according to the invention.

The above described needs are met by a nozzle cap shown in FIGS. 2 and 3. A nozzle 22, is closed at its open end 40 by a nozzle cap 42 according to the invention. As shown, the nozzle 22 is an elongated, generally cylindrical member, preferably made from stainless steel or a suitable Inconel® brand nickel-chromium-iron alloy, having an axis 44, and defining an outer cylindrical surface 46 having external threads 43 on the outer surface 46.

The nozzle cap 42 of the invention is defined by a nozzle cap body 48 having a closure portion 41 for closing the open end 40 of the nozzle and defined by a substantially cylindrical portion 50 having an axial thickness sufficient to accommodate pressure from within the nozzle 22. The nozzle cap body merges unilaterally from the closure portion 41 into an axially extending skirt portion 51 having internal threads 52 for mating with the external threads 43 on the nozzle 22. The skirt portion 51 is defined by an annular cross section and terminates at about an area 54 to which a flexible element 56 is integrally secured, such as by machining. The flexible element is unitarily secured to a weldment portion 58 at the lowermost axial portion of the flexible element.

The flexible element is defined by an internal generally circular first portion 60, a generally circular second portion 61 having a radius of curvature which may be greater than the radius of curvature of the first portion 60. The second portion merges gently into a third curved portion 62 which may have a radius of curvature smaller than that of either the first or second portions 60 and 61. Together the portions 60, 61, 62 define a narrowed wall forming the flexible element 56.

The weldment portion 58 is thereafter welded to the external surface 46 with a weldment 66 compatible with the materials of the nozzle 22 and the weldment portion 58 of the nozzle cap, for example stainless steel or Inconel® brand metal.

By virtue of the flexible element 56, slight relative movement between the nozzle cap and the nozzle, such as is caused by vibration, pulsing, or the like, is better accommodated than a fixed, rigid connection.

Having described an embodiment of the invention, it is to be understood that the invention is not limited to any of the precise embodiments described herein. Various changes and modifications could be effected by one skilled in the art without departing from the spirit or scope of the invention as defined in the appended claims.

What is claimed, is:

1. A nozzle cap for sealing a nozzle, comprising:
   a closure portion of an axial thickness suitable for closing an open end of said nozzle under a predetermined pressure from within said nozzle;
   a skirt portion, cylindrically formed beneath said closure portion in an axial direction, and surrounding a portion of said nozzle;
   a flexible element integrally secured, at an uppermost part of said flexible element in the axial direction, to said skirt portion; and
   a weldment lip secured, at an uppermost part of said lip in the axial direction, to said flexible element, and welded, at a lowermost portion of said lip in the axial direction, to said nozzle.

2. A nozzle cap according to claim 1, wherein said flexible element comprises:
   a first concave portion, located on a surface opposing a surface of said nozzle;
   a second concave portion, located on a surface opposite the surface of said first concave portion; and
   a third concave portion, located on the same surface as said second concave portion.

3. A nozzle cap according to claim 1, wherein said skirt portion comprises an inner surface having a set of threads that mate with another set of threads located on an outer surface of said nozzle.

4. A nozzle cap according to claim 2, wherein said second concave portion has a greater radius of curvature than a radius of curvature of said first concave portion.

5. A nozzle cap according to claim 2, wherein said second and third concave portions are connected by a convex portion, and wherein said third concave portion has a smaller radius of curvature than said second concave portion.

6. A nozzle cap according to claim 1, wherein said nozzle is made of stainless steel or an Inconel® brand alloy, and wherein said weldment lip is welded to said nozzle using a weldment material of either stainless steel or Inconel® brand nickel-chromium-iron alloy.

7. A method for sealing a nozzle which penetrates a nuclear reactor vessel, comprising the steps of:
   providing a nozzle cap which comprises:
      a closure portion of an axial thickness suitable for closing an open end of said nozzle under a predetermined pressure from within said nozzle,
      a skirt portion, cylindrically formed beneath said closure portion in an axial direction, and surrounding a portion of said nozzle, said skirt portion having an inner surface which includes a set of threads that mate with another set of threads located on an outer surface of said nozzle,
      a flexible element integrally secured, at an uppermost part of said flexible element in the axial direction, to said skirt portion, and
      a weldment lip secured, at an uppermost part of said lip in the axial direction, to said flexible element;
   attaching said nozzle cap to said nozzle by rotating said nozzle cap, thereby matching said set of threads on said skirt portion with said set of threads of said nozzle, until said closure portion of said nozzle cap closes said open portion of said nozzle; and
   welding said weldment lip, at a lowermost portion of said lip in the axial direction, to said nozzle.

8. A method for sealing a nozzle which penetrates a nuclear reactor vessel according to claim 7, wherein said step of providing a nozzle cap further comprises:

machining said flexible element to comprise:
- a first concave portion, located on a surface opposing a surface of said nozzle;
- a second concave portion, located on a surface opposite the surface of said first concave portion; and
- a third concave portion, located on the same surface as said second concave portion.

9. A method for sealing a nozzle which penetrates a nuclear reactor vessel according to claim 8, wherein said machining step further comprises machining said second concave portion to have a greater radius of curvature than a radius of curvature of said first concave portion.

10. A method for sealing a nozzle which penetrates a nuclear reactor vessel according to claim 8, wherein said machining step further comprises:
- forming said second and third concave portions to be connected by a convex portion, and
- machining said third concave portion to have a smaller radius of curvature than said second concave portion.

11. A method for sealing a nozzle which penetrates a nuclear reactor vessel according to claim 7, wherein said nozzle is made of stainless steel or an Inconel® brand alloy, and wherein said welding step is performed using a weldment material of either stainless steel or Inconel® brand nickel-chromium-iron alloy.

12. A nozzle cap, for sealing a nozzle which penetrates a nuclear reactor vessel, comprising:
- a closure portion suitable for closing an open end of said nozzle under a predetermined pressure from within said nozzle;
- a skirt portion, cylindrically formed beneath said closure portion in an axial direction, and surrounding a portion of said nozzle;
- means for accommodating movement, between said nozzle cap and said nozzle, caused by vibration and pulsing due to said pressure within said nozzle; and
- a weldment lip, connected to said nozzle cap and welded, at a lowermost portion of said lip in the axial direction, to said nozzle.

* * * * *